United States Patent
Kobayashi

(10) Patent No.: US 6,889,549 B2
(45) Date of Patent: May 10, 2005

(54) ASSEMBLING METHOD OF TIRE AND WHEEL RIM

(75) Inventor: Hiroyuki Kobayashi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/645,497

(22) Filed: Aug. 22, 2003

(65) Prior Publication Data

US 2004/0035516 A1 Feb. 26, 2004

(30) Foreign Application Priority Data

Aug. 22, 2002  (JP) ........................ 2002-242502

(51) Int. Cl.⁷ .................... G01M 1/00; B60B 27/00
(52) U.S. Cl. ........................ 73/459; 301/5.22
(58) Field of Search .............. 73/66, 457–461, 73/468; 301/5.21, 5.22; 295/6; 74/573 R

(56) References Cited

U.S. PATENT DOCUMENTS

| | | | |
|---|---|---|---|
| 3,483,738 A | * 12/1969 | Schweizer | .............. 73/66 |
| 5,120,113 A | * 6/1992 | Oyama et al. | .............. 301/5.22 |
| 5,171,067 A | * 12/1992 | Kawabe et al. | .............. 301/5.22 |
| 5,454,627 A | * 10/1995 | Kawabe et al. | .............. 301/5.22 |
| 6,736,007 B2 | * 5/2004 | Watanabe et al. | .............. 73/459 |

\* cited by examiner

*Primary Examiner*—Russell D. Stormer
*Assistant Examiner*—Jason R. Bellinger
(74) *Attorney, Agent, or Firm*—Birch, Stewart, Kolasch & Birch, LLP

(57) ABSTRACT

A phase $\theta c$ of a correction unbalance found by the following formula (1) is determined by using a Radial Runout (RRO) value $Wr1$ in a primary component of the RRO of the wheel rim, a phase $\theta r1$ (unit: °) of a peak position thereof, an unbalance level $Wub$ of a heavy point of the wheel rim, a phase $\theta ub$ thereof, a distance $L$ of a balance weight sticking position, a weight $Tt$ of the tire, and a phase $\alpha t$ of a light point of the tire. The tire and the wheel rim are assembled in a state of aligning the phase $\theta c$ of the correction unbalance with the phase $\alpha t$ of the light point of the tire.

$$\theta c = \text{Tan}^{-1}[[Wub \times \text{Sin } \theta ub + \{(Wr1 \times Tt)/(2 \times L)\} \times \text{Sin } \theta r1] / [Wub \times \text{Cos } \theta ub + \{(Wr1 \times Tt)/(2 \times L)\} \times \text{Cos } \theta r1]] \qquad (1).$$

1 Claim, 6 Drawing Sheets

+

⇓

RRO primary wave form

ASSEMBLING METHOD OF TIRE AND WHEEL RIM

This nonprovisional application claims priority under 35 U.S.C. § 119(a) on patent application Ser. No. 2002-242502 filed in JAPAN on Aug. 22, 2002, which is herein incorporated by reference.

BACKGROUND OF THE INVENTION

1. Field of the Invention

The present invention relates to an assembling method of a tire and a wheel rim, which can lighten a gravity of a balance weight for correcting a weight unbalance in an assembled structure of the tire and the wheel rim.

2. Description of the Related Art

When a weight unbalance exists in an assembled structure of a tire and a wheel rim, the weight unbalance causes a vehicle vibration. Therefore, in order to reduce the weight unbalance mentioned above, it has been conventionally, generally carried out to assemble the tire in the wheel rim in a state of aligning a phase of an air valve position regarded as a heavy point of the wheel rim with a phase of a light point of the tire. Thus, it is possible to cancel a part of the weight unbalance, so that it is possible to reduce the gravity of the balance weight for correcting the weight unbalance in the assembled structure of the tire and the wheel rim.

However, the balance weight mentioned above is normally mounted to the leading end of the rim, thereby deteriorating an outer appearance and causing a cost increase. Therefore, it is desired to further reduce the weight.

In view of such a circumstance, the present inventor has conducted studies. As a result, the present inventor has found that the effect of canceling the weight unbalance can be enhanced and the gravity of the balance weight can be more reduced, by assembling the tire and the wheel rim while taking into consideration a Radial Runout (RRO) corresponding to an eccentricity of the wheel rim.

More specifically, the wheel rim 1 generally has an average RRO of the order of 0.4 mm and, as conceptually shown in FIG. 5A, a center displacement δ is generated between a center of rotation i and a center j of an outer periphery of a rim sheet 1a. On the other hand, the tire 10 is approximately concentrically attached to the rim sheet 1a. Therefore, a moment corresponding to a product Tt×δ of a tire weight Tt and the displacement δ is applied around the rotation center i, and a further weight unbalance is generated.

Accordingly, it has been found that the effect of canceling the weight unbalance can be more enhanced, and the gravity of the balance weight can be further reduced, on the basis of the following matters (1) and (2), as conceptually shown in FIG. 5B.

(1) A vector $\vec{Wc}$ of a correction unbalance is determined by adding a vector $\vec{Wub}$ of a weight unbalance of a wheel rim itself to a vector $\vec{W1}$ of a weight unbalance based on the RRO.

(2) The tire and the wheel are assembled by aligning a phase of the vector $\vec{Wc}$ with the phase of the light point of the tire.

SUMMARY OF THE INVENTION

An object of the present invention is to provide a method of assembling a tire and a wheel rim which can increase an effect of canceling a weight unbalance to the maximum, and can further reduce a gravity of the balance weight.

In order to achieve the object mentioned above, in accordance with a first aspect of the present invention, there is provided a method of assembling a tire and a wheel rim that includes the following steps.

A first step involves (1) determining a Radial Runout (RRO) value Wr1 (unit: mm) in a primary component of the RRO of the wheel rim, a phase θr1 (unit: °) of a peak position thereof, an unbalance level Wub (unit: g) of a heavy point in a weight unbalance of the wheel rim, a phase θub thereof (unit: °), a radial distance L (unit: mm) of a balance weight mounting position for correcting the weight unbalance from an axis center of the wheel rim, a weight Tt (unit: mm) of the tire, and a phase αt of a light point in the weight unbalance of the tire.

A second step involves: (2) determining a phase θc of a correction unbalance Wc found by the following formula (1), by using the RRO value Wr1, the phase θr1, the unbalance level Wub, the phase θub, the distance L, the weight Tt and the phase αt determined in the preceding step. Formula (1) is:

$$\theta c = \text{Tan}^{-1}[[Wub \times \text{Sin } \theta ub + \{(Wr1 \times Tt)/(2 \times L)\} \times \text{Sin } \theta r1]/[Wub \times \text{Cos } \theta ub + \{(Wr1 \times Tt)/(2 \times L)\} \times \text{Cos } \theta r1]] \quad (1)$$

A third step involves: (3) assembling the tire and the wheel rim in a state of aligning the phase θc of the correction unbalance Wc with the phase αt of the light point of the tire.

DESCRIPTION OF THE PREFERRED EMBODIMENT

Figure 1:
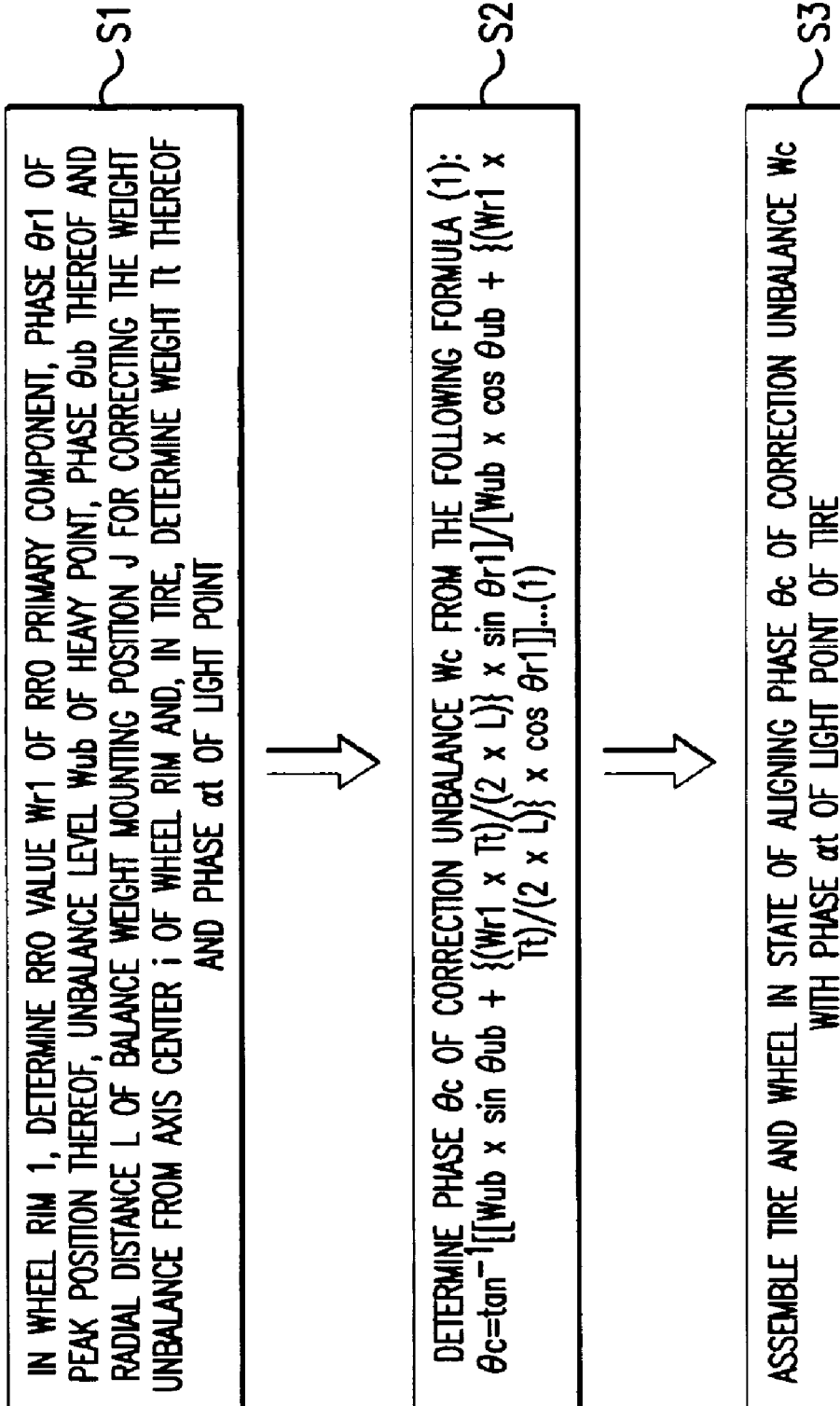
FIG. 1 is a flow chart describing a method of assembling a tire and a wheel rim in accordance with the present invention.

Hereinafter, description will be given of an embodiment in accordance with the present invention with reference to the accompanying drawings. FIG. 1 is a flow chart describing a method of assembling a tire and a wheel rim (hereinafter, referred to as an assembling method) in accordance with the present invention, and FIG. 2 is a diagram describing the assembling method.

Figure 2:
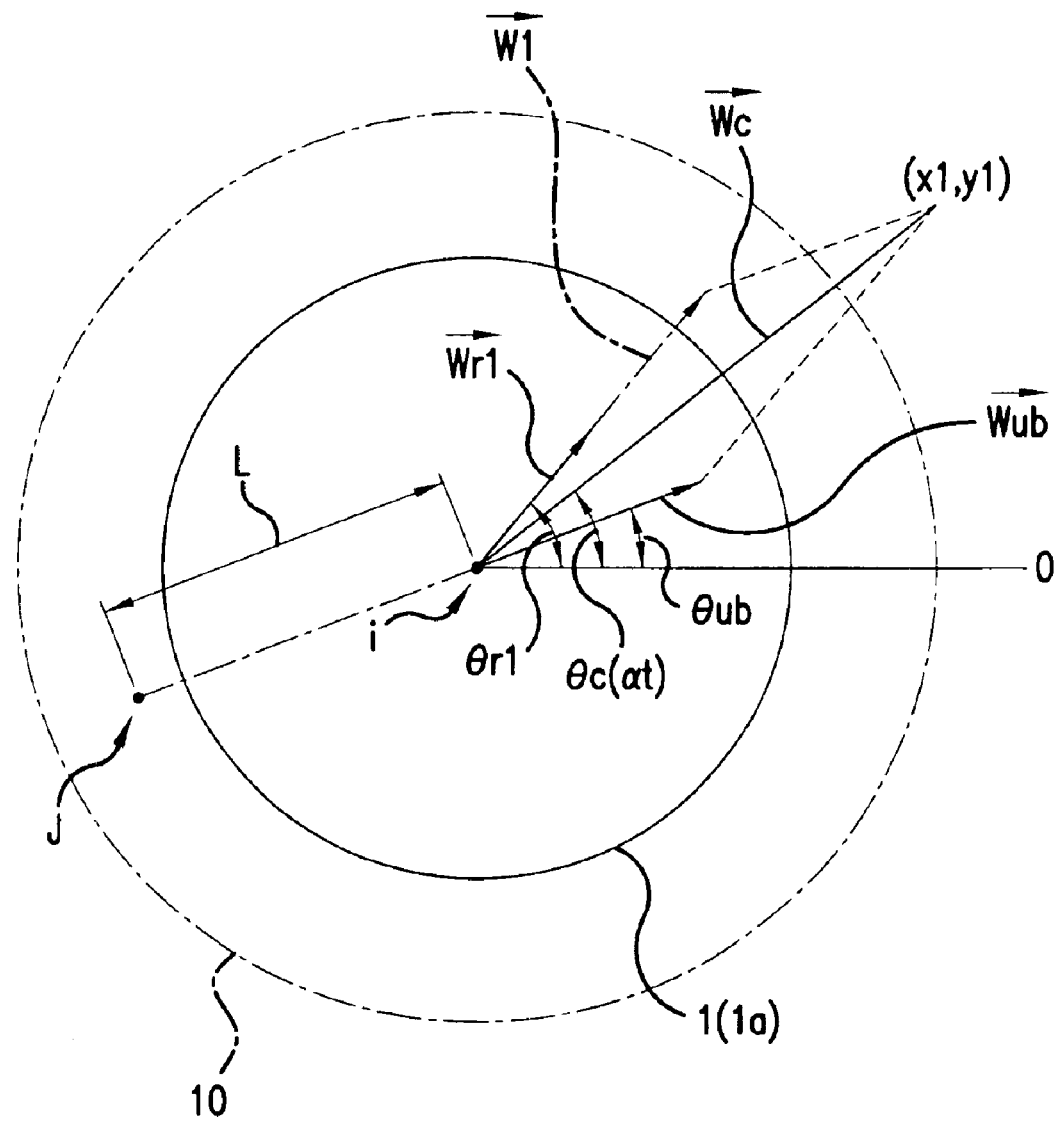
FIG. 2 is a diagram describing the assembling method.

In FIGS. 1 and 2, the assembling method comprises the following steps:

(1) step S1 of determining a Radial Runout (RRO) value Wr1 (unit: mm) in a primary component of the RRO of a wheel rim 1, a phase θr1 (unit: °) of a peak position thereof, an unbalance level Wub (unit: g) of a heavy point in a weight unbalance of the wheel rim 1, a phase θub thereof (unit: °), a radial distance L (unit: mm) of a balance weight mounting position J for correcting the weight unbalance from an axis center i of the wheel rim, a weight Tt (unit: mm) of a tire 10, and a phase αt of a light point in the weight unbalance of the tire 10;

(2) step S2 of determining a phase θc of a correction unbalance Wc found by the following formula (1), by using each of the values determined in step S1; and $$\theta c = \text{Tan}^{-1}[[Wub \times \text{Sin } \theta ub + \{(Wr1 \times Tt)/(2 \times L)\} \times \text{Sin } \theta r1]/[Wub \times \text{Cos } \theta ub + \{(Wr1 \times Tt)/(2 \times L)\} \times \text{Cos } \theta r1]] \quad (1)$$

(3) step S3 of assembling the tire and the wheel rim in a state of aligning the phase θc of the correction unbalance Wc with the phase αt of the light point of the tire 10.

Figure 3:
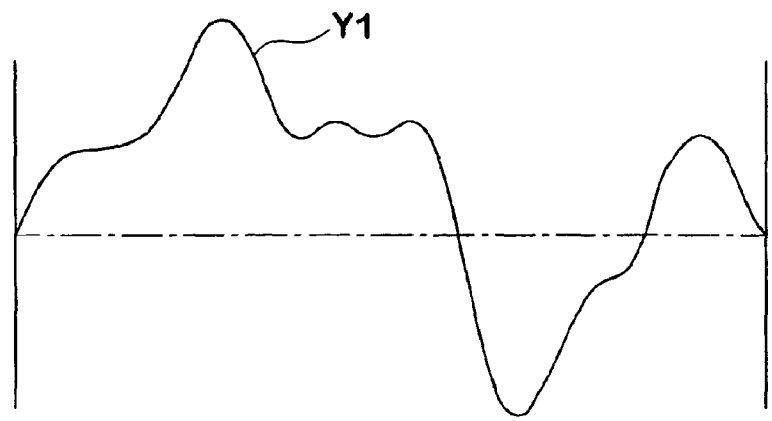
FIG. 3 is a graph showing an average curve determined by a RRO curve of rim sheets in both sides.
Figure 3:
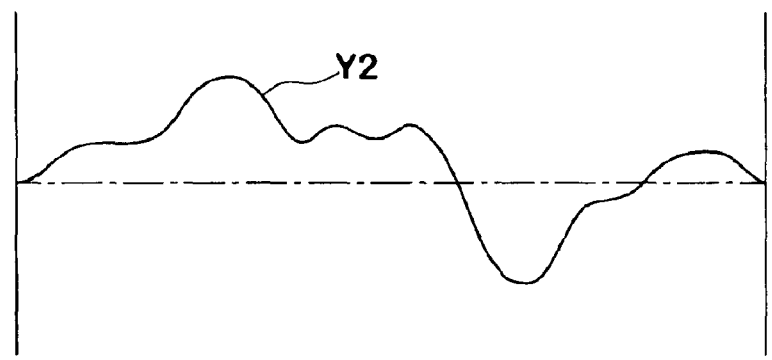
Figure 3:
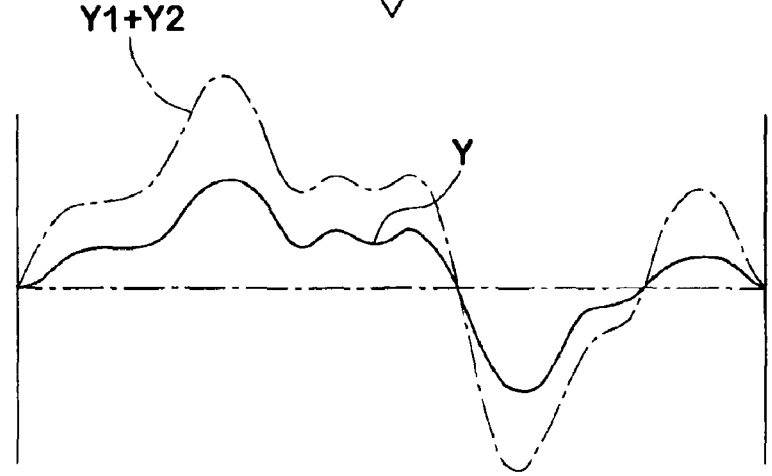
Figure 4:
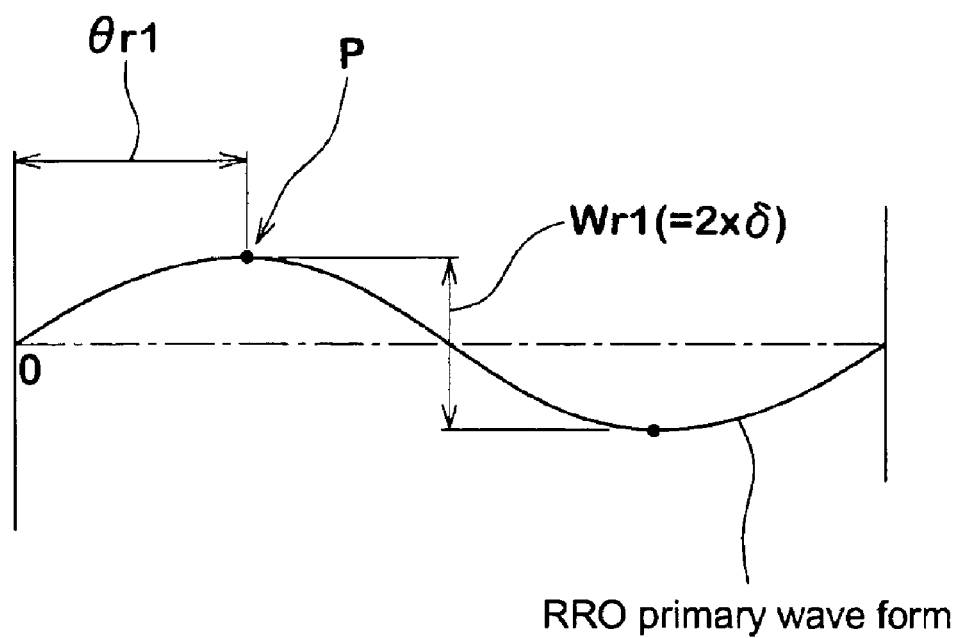
FIG. 4 is a wave form chart of a primary component determined by an order analysis of the average curve.

In step S1, the primary component of the RRO of the wheel rim 1 is determined by measuring the RRO of the rim sheets 1a in both sides of the wheel rim 1 and order analyzing an average curve Y of the RRO curves Y1 and Y2 as shown in FIGS. 3 and 4.

More specifically, the RRO of each of the rim sheets 1a can be easily measured by using a well-known measuring device such as a contact type displacement gauge. Further, the average curve Y can be obtained by overlapping and averaging the RRO curves Y1 and Y2 of the respective rim sheets 1a from the measurement result with each other, and a wave form of the primary component (a primary wave form) of the RRO is introduced by order analyzing the average curve Y, as shown in FIG. 4. Thus, the RRO value Wr1 in the primary wave form and the phase θr1 of the peak position P corresponding to the maximum crest portion of the primary wave form are determined. In this case, the RRO value Wr1 and the phase θr1 may be directly calculated by numerically analyzing the measurement result of the RRO without determining the primary wave form.

In this case, the RRO value Wr1 corresponds to an amplitude of the primary wave form, and a center displacement δ (an eccentricity δ) of the wheel rim 1 substantially corresponds to one half of the RRO value Wr1. Further, the phase θr1 corresponds to a phase (an angle) in a peripheral direction of the wheel rim 1 from a predetermined reference position O (0°), and an air valve position may be appropriately set as the reference position O, for example.

Further, the weight unbalance of the wheel rim 1 can be measured by using a well-known measuring device such as an unbalance measuring device (so-called balancer), and it is possible to obtain the unbalance level Wub of the heavy point, and the phase θub (the phase from the reference position O). In this case, the unbalance level Wub means a value obtained by converting into a gravity of the balance weight mounted to a position of the distance L apart from the axis center i of the wheel rim in a radial direction (the balance weight mounting position), in other words, a gravity of the balance weight capable of balancing with the unbalance level Wub when the balance weight is mounted to the position in a side of the light point. The leading end of the rim is generally set to the balance weight mounting position.

Further, the weight unbalance of the tire 10 can be measured by the unbalance measuring device or the like in the same manner as that of the wheel rim 1, and the phase αt of the light point (the phase from the reference position O) can be obtained.

Next, description will be given of the correction unbalance Wc obtained by correcting the weight unbalance of the wheel rim 1 by the primary component of the RRO corresponding to the substantial eccentricity δ of the wheel rim 1.

Figure 5A:
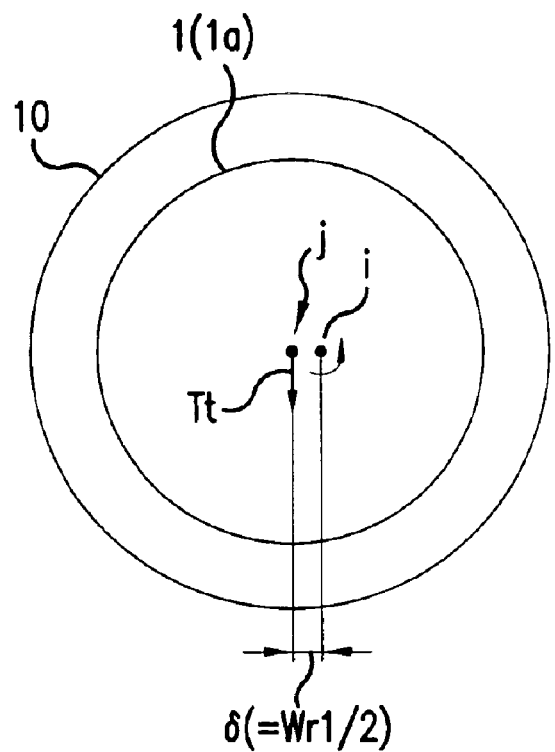
FIG. 5A is a diagram describing an influence applied to a weight unbalance by the RRO.

The tire 10 is approximately concentrically attached to the rim sheet 1a, as shown in FIG. 5A. On the contrary, in the rim sheet 1a, the eccentricity δ corresponding to one half of the RRO value Wr1 is generated between a center j of the rim sheet 1a and the wheel rim axis center i (the center of rotation). Therefore, the moment corresponding to the product Tt×δ of the tire weight Tt and the displacement δ is applied around the wheel rim axis center i. Accordingly, the further weight unbalance is generated.

Figure 5B:
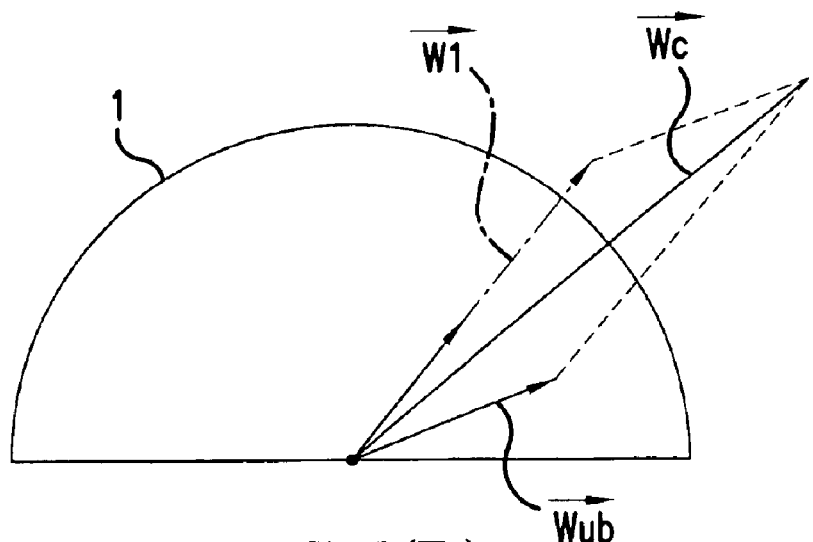
FIG. 5B is a vector diagram describing a correction of a weight unbalance of the wheel rim by the RRO.

Therefore, as shown in FIGS. 2 and 5B, it is necessary to use a new correction unbalance vector $\overrightarrow{Wc}$ corrected by adding the weight unbalance vector $\overrightarrow{Wub}$ of the wheel rim 1 itself to the weight unbalance vector $\overrightarrow{W1}$ based on the RRO.

(Vector $\overrightarrow{Wub}$)+(Vector $\overrightarrow{W1}$)=(Vector $\overrightarrow{Wc}$)

Herein, the vector $\overrightarrow{Wc}$ is expressed by an xy coordinate (x1, y1). As shown in FIG. 2, the xy coordinate (x1, y1) is expressed by the following equation.

$x1 = Wub \times \text{Cos } \theta ub + W1 \times \text{Cos } \theta r1$ $y1 = Wub \times \text{Sin } \theta ub + W1 \times \text{Sin } \theta r1$ Further, the value W1 is expressed by the formula Tt×δ/L, that is, (Wr1×Tt)/(2×L) by converting into the gravity of the balance weight.

Accordingly, the phase θc of the vector $\overrightarrow{Wc}$ is expressed by the following formula (1).

$$\theta c = \text{Tan}^{-1}(y1/x1) \quad (1)$$
$$= \text{Tan}^{-1}[[Wub \times \text{Sin}\theta ub + \{(Wr1 \times Tt)/(2 \times L)\} \times \text{Sin}\theta r1]/$$
$$[Wub \times \text{Cos}\theta ub + \{(Wr1 \times Tt)/(2 \times L)\} \times \text{Cos}\theta r1]]$$

It is possible to enhance the effect of canceling the weight unbalance of the tire 10 to the maximum by assembling the tire and the wheel rim in a state of aligning the phase θc of the correction unbalance Wc obtained by substituting the respective values determined in step S1 for the formula (1), with the phase αt of the light point of the tire 10. As a result, it is possible to reduce the gravity of the balance weight assembled for correcting the unbalance of the assembled structure of the tire and the wheel rim, after assembling.

The description has been given of the particularly preferable embodiment in accordance with the present invention. However, the present invention is not limited to the embodiment, and can be carried out by modifying into various aspects.

EXAMPLE

Two kinds of wheel rims 1A and 1B each having a rim size of 6JJ×15 were prepared, and there were measured the RRO value Wr1 in the primary component of the RRO of each of the wheel rims 1A and 1B, the phase θr1 of the peak position thereof, the unbalance level Wub of the heavy point in the weight unbalance of the wheel rim, the phase θub thereof, and the radial distance L of the balance weight sticking position for correcting the weight unbalance from the axis center of the wheel rim. The results of measurement are shown in Table 1.

TABLE 1

|  | Wheel rim 1A | Wheel rim 1B |
|---|---|---|
| RRO Value Wr1 | 0.39 mm | 0.45 mm |
| Phase θr1 | 40° | 85° |
| Unbalance level Wub | 18 g | 17 g |
| Phase θub | 0° | 0° |
| Distance L | 190 mm | 190 mm |
| Phase θc | 13.4° | 30.9° |

Further, nine tires each having a tire size of 195/65R15 and a tire weight Tt (9100 g) were prepared, and there were measured the weight unbalance level Wt and the position of the light point in each of the tires. The weight unbalance levels Wt were (3 g, 10 g, 12 g, 19 g, 26 g, 30 g, 33 g, 40 g, 46 g), respectively.

Further, the phase θc of the correction unbalance Wc in each of the wheel rims 1A and 1B was determined by using the formula (1), and the results are shown in Table 1.

Next, the wheel rims 1A and 1B, and nine tires were assembled, and the gravity of the balance weight required for correcting the unbalance of the assembled structure was compared after assembling. The results are shown in Table 2. In this case, in Comparative Example, the wheel rim and the tire are assembled in a state of aligning the phase θub of the heavy point of the wheel rim with the phase αt of the light point of the tire. In Example, the wheel rim and the tire are assembled in a state of aligning the phase θc of the correction unbalance with the phase αt of the light point of the tire.

TABLE 2

|  | Wheel rim 1A | | | Wheel rim 1B | | |
|---|---|---|---|---|---|---|
| Unbalance level Wt of tire | Comparative Example | Example | Weight reduction effect | Comparative Example | Example | Weight reduction effect |
| 3 g | 23 g | 23 g | 0 g | 18 g | 17 g | 1 g |
| 10 g | 16 g | 14 g | 2 g | 13 g | 10 g | 3 g |
| 12 g | 14 g | 13 g | 1 g | 12 g | 9 g | 3 g |
| 19 g | 8 g | 5 g | 3 g | 11 g | 3 g | 8 g |
| 26 g | 7 g | 1 g | 6 g | 13 g | 7 g | 6 g |
| 30 g | 8 g | 2 g | 6 g | 16 g | 9 g | 7 g |
| 33 g | 11 g | 9 g | 2 g | 19 g | 14 g | 5 g |
| 40 g | 17 g | 14 g | 3 g | 25 g | 19 g | 6 g |
| 46 g | 22 g | 20 g | 2 g | 30 g | 25 g | 5 g |

Figure 6A:
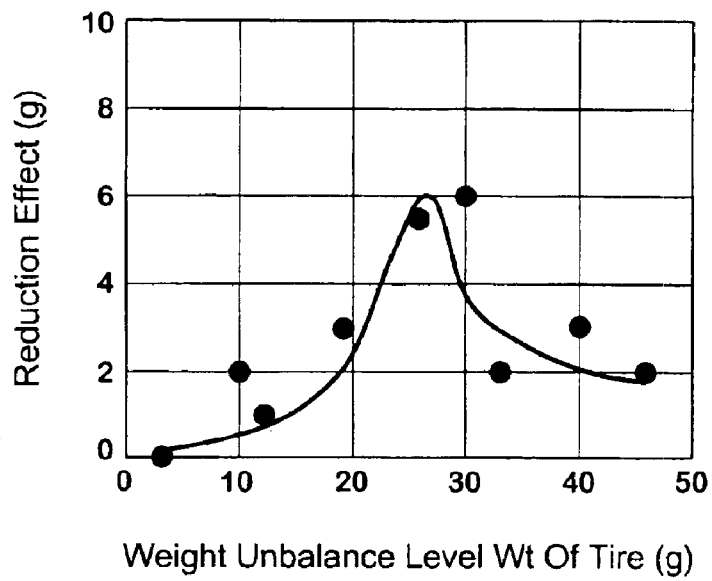
FIGS. 6A and 6B are diagrams each showing a relation between a weight unbalance level of the tire in Table 2 and an effect of reducing the gravity of the balance weight.
Figure 6B:
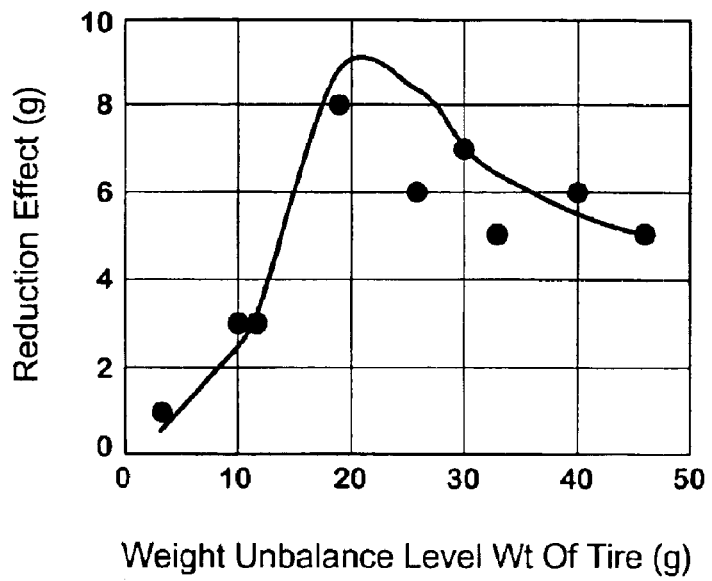

As shown in Table 2, it can be confirmed that in Example, the effect of canceling the weight unbalance is enhanced and the gravity of the balance weight can be reduced. A relation between the weight unbalance level Wt of the tire in Table 2 and the effect of reducing the gravity of the balance weight is shown in FIGS. 6A and 6B. As shown in the figures, it is confirmed that the effect of reducing the gravity of the balance weight in accordance with the present invention is more effectively achieved in a range of the weight unbalance level Wt between 15 and 45 g.

As mentioned above, in accordance with the present invention, the new correction unbalance is determined by correcting the weight unbalance of the wheel rim by the RRO primary component corresponding to the substantial eccentricity of the wheel rim, and the tire and the wheel rim are assembled in a state of aligning the phase of the correction unbalance with the phase of the light point of the tire. It is therefore possible to enhance the effect of canceling the weight unbalance to the maximum, and it is possible to further reduce the gravity of the balance weight.

What is claimed is:

1. A method of assembling a tire and a wheel rim, comprising the steps of:

(1) determining a Radial Runout (RRO) value (Wr1) (unit: mm) in a primary component of the RRO of the wheel rim, a phase (θr1) (unit: °) of a peak position (P) corresponding to the maximum crest portion of the primary wave form, an unbalance level (Wub) (unit: g) of a heavy point in a weight unbalance of the wheel rim, a phase (θub) (unit: °) of said unbalance level (Wub), a radial distance (L) (unit: mm) of a balance weight mounting position for correcting the weight unbalance from an axis center of the wheel rim, a weight (Tt) (unit: mm) of the tire, and a phase (αt) of a light point in the weight unbalance of the tire;

(2) determining a phase (θc) of a correction unbalance (Wc) found by the following formula (1), by using the RRO value (Wr1), the phase (θr1), the unbalance level (Wub), the phase (θub), the distance (L), the weight (Tt) and the phase (αt) determined in the preceding step; and $$\theta c = \operatorname{Tan}^{-1}[[Wub \times \operatorname{Sin} \theta ub + \{(Wr1 \times Tt)/(2 \times L)\} \times \operatorname{Sin} \theta r1]/[Wub \times \operatorname{Cos} \theta ub + \{(Wr1 \times Tt)/(2 \times L)\} \times \operatorname{Cos} \theta r1]] \quad (1)$$

(3) assembling the tire and the wheel rim in a state of aligning the phase (θc) of the correction unbalance Wc with the phase (αt) of the light point of the tire.

* * * * *